May 27, 1952 R. P. M. DAVIS Re. 23,505

HAIRCUTTING COMB

Original Filed Aug. 19, 1946

INVENTOR.
Roy P. M. Davis
BY
W. E. Beatty
ATTORNEY

Reissued May 27, 1952 Re. 23,505

UNITED STATES PATENT OFFICE 23,505

HAIRCUTTING COMB

Roy P. M. Davis, Bonsall, Calif., assignor, by mesne assignments, to Cutter Corporation, a corporation of Delaware Original No. 2,519,954, dated August 22, 1950, Serial No. 691,448, August 19, 1946. Application for reissue August 18, 1951, Serial No. 242,561

17 Claims. (Cl. 30—31)

Matter enclosed in heavy brackets [ ] appears in the original patent but forms no part of this reissue specification; matter printed in italics indicates the additions made by reissue.

The invention relates to a hair cutting comb and more particularly to a comb having an adjustable razor blade thereon, the blade being adjustable to different positions on the comb for use as a hair trimmer, or comb.

Heretofore it has been proposed to provide a hair trimmer having an adjustable razor blade thereon, with a bolt and nut for holding the blade in its position of adjustment, and wherein the adjustment is made by pushing the blade by hand to its desired position. This has the objection that it is difficult or awkward to move the blade parallel to itself with its cutting edge at right angles to the teeth, and then hold it in its new position while tightening the bolt.

An object of the present invention is to provide a cutting implement useful as a hair cutting comb, an ordinary comb, and as a razor, with a motion transmitting mechanism under control of a knob for moving the cutting edge parallel to itself the desired amount, and with means preferably under control of the same knob, for locking the blade in its adjusted position, the mechanical movement having parts which may be readily coupled and uncoupled so that a used blade can be readily removed from the holder and a new one substituted therefor.

Another object is to provide improved means for guiding the razor blade so that its cutting edge moves parallel to itself and at right angles to the median of the comb teeth.

Another object is to provide an improved razor blade holder.

The invention provides a hair cutting comb wherein the device may be employed to thin the hair, or it may be adjusted to different positions along the teeth to cut hair of different lengths, or it may be adjusted to a position adjacent the tips of the teeth to serve as a razor. The comb preferably has teeth on opposite sides thereof and the blade is adjustable away from the teeth on one side so that the device may also be employed as an ordinary comb.

Figure 1:
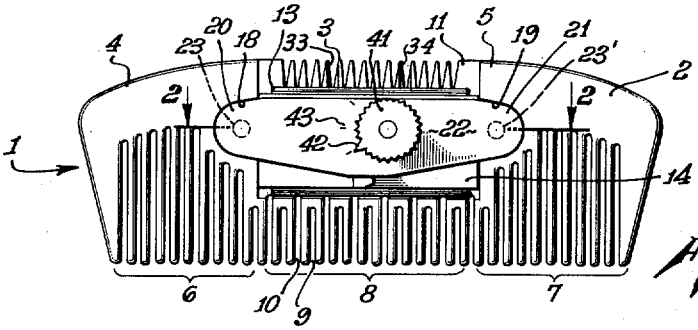

For further details of the invention, reference may be made to the drawings wherein:

Fig. 1 is a plan view of a hair cutting comb according to the present invention.

Figure 2:
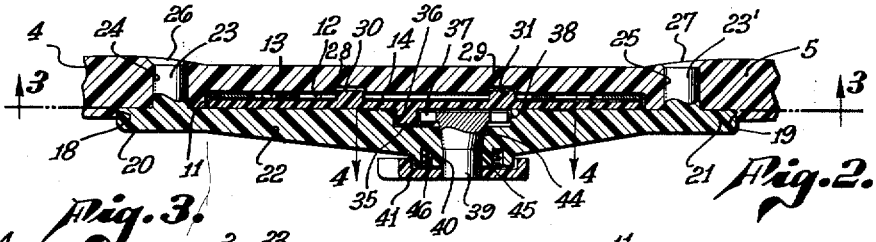
Figure 3:
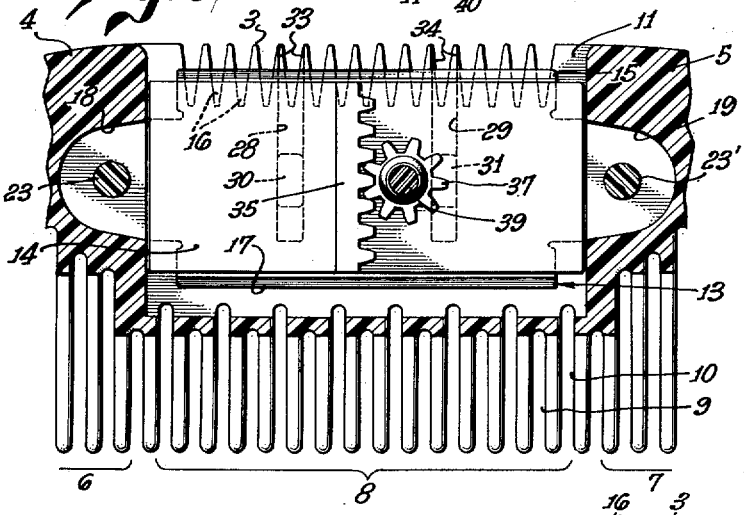
Figure 4:
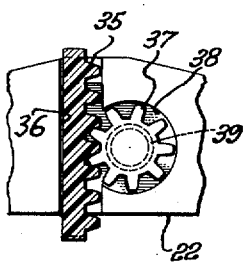

Figs. 2, 3, and 4 are enlarged sectional views with parts broken away on lines of the corresponding numbers in Figs. 1 and 2, looking in the direction of the arrows. In Fig. 3 the section is taken on a broken line below pinion 37 and looking at what appears in Fig. 2 as the bottom of the blade holder.

Figure 6:
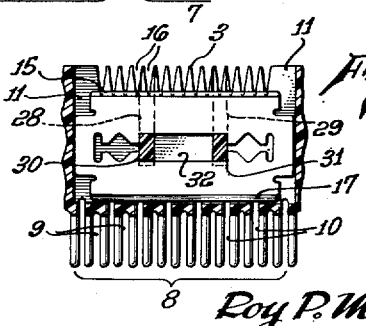
Figure 5:
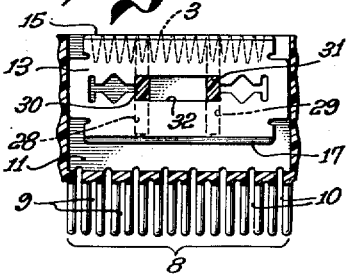

Figs. 5 and 6 are plan views partly in section, with parts broken away showing the razor blade in different positions of adjustment.

Referring in detail to the drawings, the comb 1 has a body portion 2 having a set of short fine teeth 3 on one side thereof intermediate the back portions 4 and 5. The comb 1 has a set of teeth 6 opposite the back 4 and a similar set of teeth 7 opposite the back 5. Between the sets 6 and 7, is a set of teeth 8 having short grooves such as 9 alternating with longer grooves such as 10.

The front of the comb as seen in Fig. 1 has a recess 11 and the bottom wall 12 of this recess lies in the same plane as the front side of the teeth 3, to form a flat surface to slidably receive a double edge razor blade 13. The teeth 3 are spaced from the teeth 8 so that the blade 13 when in the position shown in Fig. 6 will have one of its edges 15 extending across the bottom of the groove 16 of the teeth 3 and its opposite edge 17 extending across the bottom of the deep grooves 10, whereby the blade is in cutting relation to all of the teeth 3 and alternate teeth in the set 8.

The front side of the backs 4 and 5 as seen in Fig. 1, have concave recesses 18 and 19 to house the rounded ends 20 and 21 of a bridge or cover plate 22. The cover plate 22 is permanently fixed to the comb 1 and it has integral pins 23 and 23′ which extend through apertures 24 and 25 in the comb, the rear end of the pins 23 and 23′ being riveted as indicated at 26 and 27.

The recess 11 is partially covered by the cover plate 22 to provide a compartment to slidably support and receive the blade holder 14 and the blade 13. The bottom wall 12 of the recess 11 has spaced parallel guide grooves 28 and 29 as shown by the dotted lines in Figs. 3, 5, and 6, to slidably receive the lugs 30 and 31 on the rear side of the blade holder 14. The lugs 30 and 31 are rectangular in shape and to accommodate them, the blade 13 is provided with a rectangular aperture 32. The blade 13 will fit well known types of double edge razor blade holders, but the usual double edge blade will not fit the holder of the present invention.

Each groove 28 and 29 has parallel sides which extend lengthwise of the teeth 3 and each groove 28 and 29 extends the full length of the teeth which they intersect as shown at 33 and 34 in Fig. 3 so as to permit the holder 14 and its blade 13 to be removed from the comb 1 by movement of holder 14 and blade 13 outwardly along and beyond the teeth 3.

The front of blade holder 14 has a rack 35 which slides in a groove 36 on the under side of the cover plate 22. The groove 36 and the rack 35 extend lengthwise of the teeth 3 and 8 and assist in guiding bladeholder 14 and blade 13 so that the cutting edges 15 and 17 move parallel to themselves and at right angles to the median line of the teeth. The rack 35 meshes with a pinion 37 housed in a recess 38 on the under side of the cover plate 22. Pinion 37 is on the inner end of a shaft 39 which is rotatably mounted in a bearing 40 in the cover plate 22. Fixed to the outer end of shaft 39 is a knob or handle 41 having a pointer 42 which cooperates with indicia 43 to indicate the different positions of adjustment of the blade 13. The blade 13 is adjusted to different positions by turning the knob 41.

To hold the blade in its adjusted position, the shaft 39 has a conical portion 44 which fits in a conical bore 45 to form a friction clutch or lock, the shaft 39 being urged outwardly by a compression spring 46 to frictionally hold the shaft 39 and blade 13 against movement. When it is desired to adjust the blade to a new position or to remove it entirely, the knob 41 is pressed in against the action of spring 46, to release the friction grip 44 and 45 and permit the knob 41 to turn and operate the pinion 37 which slides across and remains in mesh with rack 35. The pinion 37 as shown preferably has a larger number of teeth than the rack 35 so that the blade 13 can be shifted the full length of recess 11 by making less than one full revolution of the knob 41.

The blade 13 can be adjusted to the position shown in Fig. 6 where it overlies the base of the teeth 3 and the base of teeth 8. The cutting edge 15 can then be used to cut hair of a certain length, preferably the exposed length of the teeth being shorter for shorter hair to be cut. The opposite side of the blade 13 can be used to cut and thin the hair as the hair in the short grooves 9 cannot reach the cutting edge 17 whereas the hair in the longer grooves 10 is cut by the edge 17. If it is desired to cut shorter hair with the teeth 3, and/or to use the teeth 6, 7 and 8 as a comb without cutting, the blade 13 may be adjusted to the intermediate position shown in Fig. 3 wherein the edge 17 is removed from the bottom of the long grooves 10 while the edge 15 extends across an intermediate portion of the teeth 3. If it is desired to use the edge 15 as a razor, the blade 13 may be adjusted to the position shown in Fig. 5 wherein the edge 15 is adjacent the tips of the teeth 3, and at this time the opposite side of the device may also be used as an ordinary comb.

When it is desired to remove an old blade and substitute a new one, the knob 41 can be rotated sufficiently to push the rack 35 out of mesh with pinion 37 to permit removal of blade 13 and holder 14 from the comb 1. A new blade is put in the holder 14 and they are inserted in the outer end of recess 11 to bring the rack 35 into mesh with pinion 37.

While I have illustrated the preferred form of mechanical movement for adjusting the blade and the preferred form for locking the blade in adjusted position, it will be apparent that various modifications may be made therein.

I claim:

1. A hair cutting comb having a body portion and teeth and having a recess in one side of said body portion, said recess having a wall flush with one side of said teeth, a cover plate secured to said body portion and extending over said recess, a blade holder slidable in said recess, an operating member movably carried by said cover plate, a motion transmitting mechanism between said member and said blade holder under said cover plate, for shifting the blade along said teeth, and means guiding said blade holder for movement of the cutting edge of the blade parallel to itself along said teeth.

2. A hair cutting comb according to claim 1 wherein said motion transmitting mechanism has separable parts, one of which is carried by said cover plate and another of which is carried by said blade holder.

3. A hair cutting comb having opposite sets of teeth, means comprising a bridge providing a compartment opening into both of said sets of teeth, a blade holder for a double edge blade slidable in said compartment, a manually operable motion transmitting mechanism having a shaft for shifting said holder along both of said sets of teeth to shift the double edge blade inwardly of one set of teeth and outwardly of the other set, said bridge having a bearing support for said shaft.

4. A comb having teeth, said comb having a bridge forming a blade and blade holder recess extending lengthwise of said teeth, said comb having under said bridge and below said recess a pair of parallel recesses extending lengthwise of said teeth, a removable blade holder slidable in said first recess along the teeth, said blade holder having a pair of lugs slidably fitting said parallel recesses, and a drive having an operative member carried by said bridge for operating said blade holder.

5. A hair trimmer and comb comprising a comb having opposite sets of teeth, said sets having parallel base lines more closely spaced than the width of a double edge razor blade, said comb having a razor blade recess greater in width than the width of said blade, said recess extending over said opposite sets, a blade holder slidable in said recess, means at one side of said recess for supporting said blade holder in said recess for movement lengthwise of the teeth of both of said sets, such movement causing the blade to recede with respect to the teeth of one set and correspondingly advance with respect to the other set, a bearing in said supporting means at one side of said comb, a rotatable shaft in said bearing, said shaft extending transversely of said comb, a pinion on the inner end of said shaft, a cooperating rack on the front of said blade holder, a guide slot for said rack in said supporting means, the rear of said blade holder having a lug to receive an aperture in the blade, the side of said comb having a guide depression for said last mentioned lug, said depression extending lengthwise of certain of said teeth.

6. A hair trimmer and comb comprising a comb having opposite sets of teeth, said sets having parallel base lines more closely spaced than the width of a double edge razor blade, said comb having a razor blade recess greater in width than the width of said blade, said recess extending over said opposite sets, a wall over said recess intermediate said sets of teeth, a double edge razor blade holder slidable in said recess, means guiding said blade holder for movement lengthwise of both of said sets of teeth, an operating shaft extending through said wall, and a driving connection behind said wall between said shaft and said blade holder.

7. A hair cutting comb comprising a body portion having teeth at one side thereof, a blade holder therefor, a guide for said blade holder, a rotatable operating member having an axis transverse to said body portion, and means supporting said operating member spaced from and transverse to said body portion, said member having an inner end having a motion transmitting mechanism for adjusting said holder to adjust the cutting edge of the blade along said teeth, said guide guiding said blade holder for sliding movement between the inner end of said operating member and said body portion.

8. In a hair cutting comb, a razor blade holder comprising a rectangular slide narrower than the distance between parallel cutting edges on a double edge razor blade having aperture means, a rack having teeth arising from the front of said slide, said rack lying within the boundary of said slide, and lug means on the rear of said slide to fit said aperture means.

9. In a hair cutting comb, according to claim 8, the ends of said slide, said rack and said lug means having parallel slide surfaces, and a comb having corresponding guide surfaces.

*10. In a hair trimming comb device, the combination of a comb body, a carrier for a sharpened blade, means for mounting the carrier for sliding movement relative to the comb body, a rotary control member on the comb body, gear means whereby the rotary control member may advance and retract the carrier, and rotation lock means on the comb body and rotary control member selectively operable through axial movement of the rotary control member.*

*11. In a hair trimming comb device, the combination of a comb body, a carrier for a sharpened blade, means for mounting the carrier for sliding movement relative to the comb body, a rotary control member on the comb body, gear means whereby the rotary control member may advance and retract the carrier, and lock means comprising cooperating parts on the comb body and rotary control member selectively engageable through axial movement of the rotary control member.*

*12. In a hair trimming comb device, the combination of a comb body, a carrier for a sharpened blade, means for mounting the carrier for sliding movement relative to the comb body, a rotary control member on the comb body, a gear on the rotary control member, a rack on the carrier meshing with the gear whereby the rotary control member may advance and retract the carrier, and lock means comprising cooperating parts on the comb body and rotary control member selectively engageable through axial movement of the rotary control member.*

*13. In a hair trimming comb device, the combination of a comb body, a carrier for a sharpened blade, means for mounting the carrier for sliding movement relative to the comb body, a rotary control member, a rack on the carrier, a gear on the rotary control member meshing with the rack whereby the rotary control member may advance and retract the carrier, and rotation lock means comprising cooperating parts on the comb body and rotary control member selectively engageable through axial movement of the rotary control member.*

*14. In a hair trimming comb device, the combination of a comb body, a carrier for a sharpened blade, means for mounting the carrier for sliding movement relative to the comb body, a rotary control member, a rack on the carrier, a gear on the rotary control member meshing with the rack whereby the rotary control member may advance and retract the carrier, and rotation lock means comprising cooperating conical friction surfaces on the comb body and rotary control member selectively engageable through axial movement of the rotary control member.*

*15. In a hair trimming comb device, the combination of a comb body, a carrier for a sharpened blade, means for mounting the carrier for sliding movement relative to the comb body, a rotary control member mounted for rotation and limited axial movement on the comb body, gear means whereby the rotary control member may advance and retract the carrier, and rotation lock means comprising cooperating parts on the comb body and rotary control member selectively engageable through axial movement of the rotary control member.*

*16. A haircutting device for use with a blade comprising in combination a comb member, a blade positioning member for holding a cutting edge of the blade in operating position with respect to the comb member, one of said members being provided with a transversely extending channel providing a seat for the other member, means for retaining the two members in operative position to each other, a driving mechanism mounted on one member on a line extending longitudinally between the cutting edge of the positioned blade and the end of the channel nearest the opposite edge of the blade, a following means positioned on the other member, whereby the driving mechanism may move the following means causing a transverse movement between the members.*

*17. A haircutting device for use with a blade comprising in combination a comb member, a blade positioning member for holding a cutting edge of the blade in operating position with respect to the comb member, one of said members having a transversely extending channel providing a seat for the other member, a driving mechanism mounted on one member having a portion thereof extending into the channel, and a following means positioned on the other member and extending into the channel, whereby the driving mechanism may engage the following means in the channel causing a transverse movement between the members.*

ROY P. M. DAVIS.

REFERENCES CITED

The following references are of record in the file of this patent and the original patent:

UNITED STATES PATENTS

| Number | Name | Date |
|---|---|---|
| Re. 18,781 | Keenan | Mar. 28, 1933 |
| 1,399,103 | Butler | Dec. 6, 1921 |
| 1,456,432 | Froh | May 22, 1923 |
| 1,536,622 | Cowan | May 5, 1925 |
| 1,789,234 | Keenan | Jan. 13, 1931 |
| 1,894,188 | Mirafuentes | Jan. 10, 1933 |
| 2,252,628 | Grachan | Aug. 12, 1941 |
| 2,461,444 | Sanders | Feb. 8, 1949 |

FOREIGN PATENTS

| Number | Country | Date |
|---|---|---|
| 185,392 | France | Mar. 8, 1923 |
| 543,781 | Great Britain | June 9, 1922 |